United States Patent Office 3,520,852
Patented July 21, 1970

3,520,852
PROCESS OF PREPARING POLYIMIDES OF STYRENE-MALEIC ANHYDRIDE POLYMERS
Richard J. Pratt, Flossmoor, and Robert J. Conboy, Rockford, Ill., assignors to Sinclair Research, Inc., New York, N.Y., a corporation of Delaware
No Drawing. Filed Oct. 19, 1967, Ser. No. 676,608
Int. Cl. C08g 20/20
U.S. Cl. 260—78
14 Claims

ABSTRACT OF THE DISCLOSURE

Hydroxy imides are prepared from styrene-maleic anhydride polymers by first partially esterifying with a low boiling alcohol of 1 to 5 carbon atoms, thus converting anhydride groups of the polymers to half esters and acid groups, then reacting the half ester polymers with a hydroxy amine at imide-forming temperature thus displacing the low boiling alcohol and forming the hydroxy imides of styrene-maleic anhydride polymers. This process minimizes cross-linkage and avoids concomitant loss of the desirable hydroxy group. This process also can be used to prepare other polyimides of styrene-maleic anhydride polymers from amines, such as from dialkylaminopropyl-amine. Such polyimides prepared by this process usually have a lighter color and contain less free amine than when prepared by direct reaction with the anhydride using excess amine. The products prepared in accordance with this process are suitable for the formulation of coatings, castings and related products.

---

This invention relates to a process for preparing polyimides of styrene-maleic anhydride polymers. More particularly this invention relates to a process for preparing hydroxy imides of styrene-maleic anhydride polymers which minimizes cross-linkage and avoids loss of the hydroxy group.

Heretofore, various copolymers of N-hydroxymethyl maleimide have been prepared by copolymerizing vinyl monomers with N-hydroxymethyl maleimide. This requires the formation of the hydroxymethyl maleimide prior to polymerization, not by reaction of the maleic anhydride polymers after they have been formed by polymerization. The maleic anhydride monomer has been ammoniated to form the imide and then reacted with formaldehyde to form the hydroxymethyl maleimide monomer. If styrene-maleic anhydride polymers are reacted directly with alkanol amines, esters are formed at lower temperatures and at imidation temperatures cross-linking occurs forming insoluble products not suitable for the formulation of coatings, castings, and related products.

It has now been found in accordance with this invention that hydroxyimides of styrene-maleic anhydride polymers can be prepared by a process which comprises reacting at imide-forming temperature an amino alcohol with a styrene-maleic anhydride polymer partially esterified with a low boiling alcohol of from 1 to 5 carbon atoms to more than about 50% half ester, thereby displacing the low boiling alcohol from the half ester and forming the hydroxyimide of the styrene-maleic anhydride polymer. Hydroxyethylimides of styrene-maleic anhydride polymers are obtained by the present process when such lower boiling alcohol half esters of styrene-maleic anhydride polymer are reacted with ethanolamine at an imide-forming temperature. The reaction of an alkanol amine with such low boiling alkanol partial esters of styrene-maleic anhydride polymers at imide forming temperature results in the formation of hydroxyalkylimides of styrene-maleic anhydride polymers with concurrent loss of water and low boiling alkanol.

With a styrene-maleic anhydride polymer as the starting material, the process of this invention comprises first partially esterifying to more than about 50% half ester, the styrene-maleic anhydride polymers with a low boiling alcohol of from 1 to 5 carbon atoms, then reacting the half ester product thus formed at imide-forming temperature with the alkanol amine, thereby displacing the low boiling alcohol from the half ester and forming the hydroxyalkylimide of the styrene-maleic anhydride polymer. This procedure promotes formation of hydroxyalkylimides of styrene-maleic anhydride copolymers without causing cross-linking of the polymer resin. It is highly desirable to use an inert low boiling solvent, preferably a low boiling hydrocarbon solvent, usually boiling below about 160–175° C., in the reaction of the half ester to form the imide. An inert low boiling solvent may also be used in the esterification reaction to form the half ester and often an inert low boiling hydrocarbon solvent in amounts of about 1–8 times the weight of the alcohol is used in the esterification reaction. However, the low boiling alcohol may be used as the solvent in the esterification reaction.

In addition to providing a facile route to hydroxyimides of styrene-maleic anhydride copolymers, the present invention provides a simple method for producing other imides of these styrene-maleic anhydride polymer resins. In the latter procedure the low boiling alcohol partial esters of styrene-maleic anhydride polymer resins are reacted directly with non-tertiary amines, such as ethyl amine, butyl amine, diethylaminopropylamine and the like, often having up to about 30 carbon atoms, preferably up to about 12 carbon atoms.

The low boiling alcohol or alkanol reactant of 1 to five carbon atoms for forming the half esters can be methanol, ethanol, propanol, butanol and pentanol or a mixture of these alcohols, such as a mixture of amyl alcohols. Such a mixture of primary amyl alcohols is commercially available and is a mixture of 1-pentanol, 2-methyl-1-butanol and isoamyl alcohol (3-methyl-1-butanol). Primary alcohols of 1 to 5 carbons, particularly alkanols of 1 to 5 carbon atoms, e.g. $RCH_2OH$ where R is alkyl of 1 to 4 carbons, are preferred because they are least hindered. Butyl and amyl alcohols are most preferred. A higher alcohol is not suitable for forming the esters in the present invention as such a higher alcohol having a longer chain, such as $C_8$ or $C_{10}$, raises the boiling point which prevents its facile removal from the product.

Low boiling oxygenated alcohols, i.e., alkoxyalkanols, of up to 5 carbon atoms may also be used. If instead of amyl alcohol a low boiling oxygenated alcohol such as 2-methoxyethanol, is used to form the partial esters, a longer reflux time of 8–16 hours is required. Oxygenated alcohols esterify styrene-maleic anhydride polymers at a rate slower than alkanols. However, the addition of a small quantity of base catalyst such as benzyldimethylamine will reduce the reflux time for partial esterification, for instance, to about one hour.

A suitable reaction temperature for partial esterification of the styrene-maleic anhydride polymers to the half esters is within the range of about 120 to 150° C., preferably about 130–140° C. or under reflux conditions of the solvent or low boiling alcohols. While higher temperatures may be used to increase the reaction rate, undesirable side reactions, such as vicinal diester formation and decarboxylation, may also occur at such higher temperatures. Decarboxylation can affect the process adversely by decreasing the extent of imide formation.

It is preferred to maintain the level of esterification of the anhydride groups in the styrene-maleic anhydride polymer to about 65 or 70% to 85% of theoretical half ester. More than about 50% half ester groups should be present as less than 50% esterification to half ester may cause crosslinking between free carboxyls and anhydride rings via the amino alcohol reactant. Higher esterification levels up to about 100% half ester or more will also work but are not necessary.

The amino alcohol is preferably an amino alcohol of the formula:

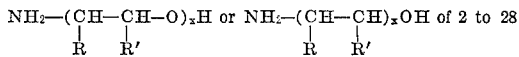

carbon atoms where R and R' are hydrogen, alkyl, e.g. methyl, or phenyl, and $x$ is 1 or 2. Primary amino alcohols, particularly primary amino alkanols, are preferred. However any amino alcohol can be used, although where theoretical considerations predict a strained configuration from steric hindrance of the amino group, the salt and imide will not form readily. Thus, there may be used amino-alcohols of the structure:

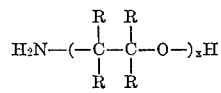

where the R's are hydrogen, alkyl, aromatic or olefinic groups and $x$ is 1, 2 or 3. One or more R groups can be ether groups. In order to avoid the possibility of steric hindrance, the amino group can be directly attached to a carbon atom bearing at least one hydrogen atom and not to a tertiary carbon atom. Polyhydric amines are not recommended because multiple hydroxyl groups enhance the possibility of cross-linking.

Monohydroxyalkyl, primary or secondary amines and monohydroxyalkoxyalkyl primary or secondary amines are preferred. A number of amino alcohols which can be used in the present invention are commercially available including 2 - aminoethanol, 4 - amino - 1 - butanol, isopropanolamine (2-hydroxy-propylamine), 2 - amino-1-butanol and "Diglycolamine," trademark for 2-(2-aminoethoxy)ethanol, ($HOCH_2CH_2OCH_2CH_2NH_2$). The present process is likewise suitable for making imides by reacting aliphatic or aromatic amines, particularly primary amines, and dialkylaminoalkylamines with the low boiling alcohol partial esters of styrene-maleic anhydride copolymers. For example, amines such as methylamine, ethylamine, n-butylamine, aniline, benzylamine and dialkylaminopropylamines, such as dimethylaminopropylamine and diethylaminopropylamine can be used. Dimethylaminopropylimide of styrene-maleic anhydride polymer has been prepared without the partial esterification step. However products prepared in this manner are usually more colored and contain traces of free amine. By the present process a lighter colored product free from amine is obtained.

Imide formation proceeds best when the reaction mixture is heated at a temperature within the range of about 140 to 170° C. One hour heating at this temperature is usually sufficient for complete conversion to the imide. However the temperature may be gradually increased from about 120 to 155–170° C., if desired.

The use of xylene, particularly a commercial mixture of the ortho-, meta- and para-xylenes, as an inert reaction medium is highly satisfactory for azeotroping out the water. Since these xylenes boil at 138–144° C. they also drive out the lower boiling butyl alcohol (B.P. 117° C.) and mixture of primary amyl alcohols (B.P. 122–138° C.) during the imide formation. However, other inert aliphatic or aromatic solvents, of similar low boiling volatility may also be used, particularly hydrocarbon solvents, such as benzene, toluene, cyclohexane, methylcyclohexane, octane, nonane and decane. After the imide reaction is complete, the excess solvent is distilled off under a slight vacuum if desired. As alcohols boiling higher than xylene are not easily displaced or removed during the imide formation or at the end of the reaction, this is a reason for using the lower boiling alcohols of 1 to 5 carbons in the process of this invention.

Upon addition of the amino alcohol to the half ester, the result is probably neutralization of a carboxyl group (acid) with amine (base) to form the amine salt. In a preferred embodiment of the invention by using an elevated temperature, such as 120–140° C., vigorous stirring and the four to five carbon alcohol half ester, this salt is easily converted to the amide-ester. A four to five carbon alcohol is preferred over a 1 to 3 carbon alcohol as the longer chain alcohol imparts some hydrocarbon solubility to the salt, promoting rapid heat exchange and rapid amide formation. The water is azeotroped from the mixture with xylene allowing a measure of the reaction speed. It is important that the conversion of salt to amide be rapid so that alcoholysis of ester group by the hydroxyl group is minimized. Excessive alcoholysis would result in gelation. About 1 to 2 hours are generally required for complete conversion to half amide-half ester. Then by heating at about 140–170° C. for about one hour, imide formation occurs with displacement of the lower boiling alcohol from the half ester. The low boiling alcohol is distilled out and excess solvent distilled off.

The imides usually melt below 200° C. and may be removed easily from the reactor as a molten mass. Analysis for hydroxyl number, percent nitrogen and acid number indicate the degree of desired conversion to imide. Reactions in the present process involve converting the anhydride polymers to half esters using about 70 to 85% or more of the required amount of low boiling alcohol, then reacting with the hydroxy primary amine forming the amine salt of the acid which remains, then forming the amide by release of water and finally forming the imide by displacement of the low boiling alcohol. This procedure minimizes cross linkage and avoids loss of the functional hydroxyl group attached to the imide.

If it is desired to effect a partial imidization, the amount of amino-alcohol can be limited to some fraction of the equivalents of anhydride used. In this way some free carboxylic acid groups remain in the final product allowing for mixed functionality.

Usually the process is carried out at atmospheric pressure. However a pressure autoclave may be employed to obtain the proper reaction temperature when the lowest boiling alcohols and solvents are used. The preferred starting concentration ranges between 60 and 75% solids in the solvent.

Styrene and maleic anhydride can be polymerized to form polymers for use in this invention by various polymerization methods. Solution polymerization methods can be employed where the monomers are polymerized in a suitable solvent using as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The polymer contains a molar ratio of polymerized styrene to polymerized maleic anhydride of about 1:1 to 4:1, preferably of about 1:1 to 3:1, and has an average molecular weight of about 500 to about 25,000 or more, preferably about 500 to about 5000, and most preferably within the range of about 600 to about 2500.

Other polymers containing maleic anhydride may be used. Also polymers derived from maleic acid, fumaric acid, itaconic (methylene succinic), citraconic (methyl maleic) and mesaconic (methyl fumaric) acids and anhydrides may be used as well as substituted maleic acid and anhydride. It is important that at least two carboxyl groups be on or near adjacent carbon atoms so that either five or six membered imide rings may form. The polymer molecular weight is about 500 to about 25,000 or more, preferably about 500 to 5000 and most preferably about 600 to 2500.

The products prepared by the process of this invention are usually relatively low melting, have low solution viscosity and show high solubility in common organic solvents. These properties are highly desirable since they permit the products prepared by this invention to be used as chemical intermediates. The polyhydric imide styrene-maleic anhydride polymer resins prepared by this invention can be used as air drying vehicles, films, etc., by esterification of the hydroxyl group with vegetable oil acids, such as soya fatty acids. Isocyanate prepolymers can be obtained by reaction with diisocyanates. Acrylic esters can be obtained by esterification of acrylic acids. These intermediates have a wide spectrum of utility in coating, molding and casting resin formulations. These polyimide resins have utility in the electronics industry because of their high temperature stability and thus can be used in coating and insulation compositions for electrical elements. They also have a potential use as photoconductive polymers.

The following examples will serve to illustrate the present invention.

EXAMPLE I

A mixture of 400 grams (1 mole) of a styrene-maleic anhydride copolymer having a 3:1 mole ratio of styrene to maleic anhydride and a molecular weight of 1800–2000, 80 grams of xylene and 88 grams (1 mole) of a commercial mixture of primary amyl alcohols (1-pentanol, 2-methyl-1-butanol, and 3-methyl-1-butanol) is heated under reflux (130–140° C.) for ½–1 hour during which time partial esterification occurs.

Then 61 grams (1 mole) of 2-amino-ethanol is added and after this addition only 1 hour at 120–155° C. is required to collect the theoretical water formed. Xylene and alcohol are stirpped from the mixture under reduced pressure. The product is the hydroxylethylimide of the styrene-maleic anhydride copolymer having 2.9% nitrogen as determined by the Kjeldahl method, the calculated nitrogen being 3.2%, and having a hydroxyl number of 128 as determined by the pyridine acetic anhydride method, the calculated hydroxyl number being 127.

EXAMPLE II

A mixture of 257 grams of the 65% n-propanol half-ester of a 2:1 mole ratio of styrene to maleic anhydride copolymer having a molecular weight of 1800–2000 and 40 grams of xylene is heated to 120° C. with stirring in a vessel equipped wtih nitrogen inlet, chargeport, and a Dean-Stark trap. By 65% n-propanol half ester is meant that sixty-five percent of the anhydride groups in the copolymers are opened by one molecule of n-propanol resulting in one ester group adjacent to one free carboxylic group. To this slurry, 61 grams of 2-aminoethanol is added over a period of 10–30 minutes, the rate of addition depending on the behavior of the exothermic reaction occurring during this addition. After the addition, the temperature is raised to 160° C. in a period of 2–4 hours. All of the theoretical (18 ml.) water azeotroped into the trap during this time. The alcohol and xylene remaining is distilled out under slightly reduced pressure. There is obtained the hydroxyethylimide of the styrene-maleic anhydride copolymer having 4.2% Kjeldahl nitrogen, with calculated nitrogen being 4.0%. The hydroxyl number found was 160, with a calculated value of 186.

EXAMPLE III

A mixture of 205 grams (1 mole) of a styrene-maleic anhydride copolymer having a 1:1 mole ratio of styrene to maleic anhydride and a molecular weight of 1500–1700, 80 grams of xylene and 74 grams (1 mole) of n-butanol is heated under reflux as in Example I during which time partial esterification occurs and the half-ester is formed. Then 61 grams (1 mole) of 2-aminoethanol is added and heated under imide-forming temperature conditions as in Example II, with distillation off of water and alcohol. After the alcohol and xylene remaining are distilled out, there is obtained the hydroxyethylimide of the styrene-maleic anhydride copolymer, having 5.5% Kjeldahl nitrogen, with calclulated nitrogen being 5.3%. The hydroxyl number found was 229, with a calculated value of 213.

EXAMPLE IV

A mixture of 250 grams of a styrene-maleic anhydride copolymer having a 1:1 mole ratio of styrene to maleic anhydride and a molecular weight of 600–700, 80 grams of xylene and 88 grams of a commercial mixture of primary amyl alcohol isomers is heated under reflux as in Example I during which time partial esterification occurs. Then 105 grams of diglycolamine

$(H_2NCH_2CH_2OCH_2CH_2OH)$ is added to the partial ester and the reaction mixture heated under imide forming conditions as in Example I to obtain the hydroxyethoxyethylimide of the styrene-maleic anhydride copolymer, having 4.2% Kjeldahl nitrogen, with calculated nitrogen being 4.0%. The hydroxyl number found was 165, with a calculated value of 157.

EXAMPLE V

A mixture of 400 grams (1 mole) of a styrene-maleic anhydride copolymer having a 3:1 mole ratio of styrene to maleic anhydride and a molecular weight of 1800–2000, 80 grams of xylene and 88 grams (1 mole) of a commercial mixture of primary amyl alcohols is heated under reflux as in Example I during which time partial esterification occurs. Then 102 grams (1 mole) of 3-dimethylaminopropylamine is added under the imide forming conditions as in Example I. There is obtained the 3-dimethylaminopropylimide of the styrene-maleic anhydride polymer, having a 5.5% Kjeldahl nitrogen, with calculated nitrogen being 5.8%. The acid titration of free trisubstituted amine group gave a value of 113 whereas the calculated value is 116.

This imide has been prepared using a 100% excess of amine without the partial esterification step. However products prepared in this manner were usually more colored and contained traces of free amine. By the present process of partial esterification prior to imidation, a lighter colored product free from amine is obtained.

It is claimed:
1. Process for preparing polyimides of styrene-maleic anhydride polymers which comprises partially esterifying, to more than about 50% up to about 100% half-ester, a styrene-maleic anhydride polymer at an esterifying temperature with a low boiling alcohol selected from the group consisting of alkanols of 1 to 5 carbon atoms, and alkoxyalkanols of up to 5 carbon atoms, said styrene-maleic anhydride polymer having a mole ratio of styrene to maleic anhydride of about 1:1 to 1:4 and a molecular weight of about 500 to about 5,000, then reacting, in an inert low boiling solvent boiling below about 175° C., the half-ester polymer thus formed with a primary amine at an imide-forming temperature within the range of about 140 to 170° C., thereby displacing the low boiling alcohol from the half-ester polymer and forming the polyimide of said styrene-maleic anhydride polymer.

2. Process as set forth in claim 1 wherein said low boiling alcohol is n-butanol.

3. Process as set forth in claim 1 wherein said low boiling alcohol is primary amyl alcohol.

4. Process as set forth in claim 1 wherein said amine is 2-aminoethanol and said polyimide is the hydroxyethylimide of styrene-maleic anhydride polymer.

5. Process as set forth in claim 1 wherein said styrene-maleic anhydride polymer is partially esterified with a primary alkanol of 1 to 5 carbon atoms in an inert low boiling hydrocarbon solvent boiling below about 175° C.

6. Process as set forth in claim 3 wherein said inert low boiling hydrocarbon solvent is xylene.

7. Process as set forth in claim 1 wherein said styrene-maleic anhydride polymer has a mole ratio of styrene to maleic anhydride of about 1:1 to 3:1, a molecular weight of about 600 to about 2500 and is partially esterified to about 65 to about 100% half ester groups.

8. Process as set forth in claim 1 wherein said amine is a primary amino alkanol and said polyimide is a hydroxyalkylimide of styrene-maleic anhydride polymer.

9. Process as set forth in claim 1 wherein said primary amine is 2-(2-aminoethoxy)ethanol and said polyimide is the hydroxyethoxyethylimide of styrene-maleic anhydride polymer.

10. Process for preparing hydroxyalkylimides of styrene-maleic anhydride polymers while minimizing crosslinking which comprises partially esterifying, to more than about 50% up to about 85% half-ester, a styrene-maleic anhydride polymer at a temperature within the range of about 120 to 150° C. with a low boiling alkanol of the formula $RCH_2ON$ where R is alkyl of 1 to 4 carbon atoms, said styrene-maleic anhydride polymer having a mole ratio of styrene to maleic anhydride of about 1:1 to 3:1 and a molecular weight of about 600 to about 2500, then reacting, in an inert low boiling hydrocarbon solvent boiling below about 175° C., the half-ester polymer thus formed with a primary amine selected from the group consisting of monohydroxyalkyl primary amines and monohydroxyoxyalkyl primary amines at an imide-forming temperature within the range of about 140 to 170° C., thereby displacing the low boiling alkanol from the half-ester polymer and forming the hydroxyimide of said styrene-maleic anhydride polymer.

11. Process as set forth in claim 10 wherein said primary amine is 2-aminoethanol.

12. Process as set forth in claim 11 wherein said low boiling alkanol is n-butanol or primary amyl alcohol.

13. Process as set forth in claim 12 wherein said inert low boiling hydrocarbon solvent is xylene.

14. Process as set forth in claim 1 wherein said inert low boiling solvent is xylene.

References Cited

UNITED STATES PATENTS

| | | | |
|---|---|---|---|
| 2,819,302 | 1/1958 | Koenecke et al. | 260—78 |
| 2,977,334 | 3/1961 | Zopf et al | 260—78 |
| 2,988,539 | 6/1961 | Cohen et al. | 260—78 |
| 3,041,315 | 6/1962 | Gerlich et al. | 260—78 |

HAROLD D. ANDERSON, Primary Examiner

U.S. Cl. X.R.

117—161; 174—110; 260—23, 77.5, 89.5, 326.5

UNITED STATES PATENT OFFICE
CERTIFICATE OF CORRECTION

Patent No. 3520852  Dated July 21, 1970

Inventor(s) Richard J. Pratt et al.

It is certified that error appears in the above-identified patent and that said Letters Patent are hereby corrected as shown below:

Column 3, line 2, change "crosslinking" to read --cross-linking--

Column 6, line 68, change "1:1 to 1:4" to read --1:1 to 4:1--

Column 7, claim 10, line 7, change "$RCH_2ON$" to --$RCH_2OH$--

Signed and Sealed MAR 9 1971

(SEAL)
Attest:

Edward M. Fletcher, Jr.
Attesting Officer

WILLIAM E. SCHUYLER, JR.
Commissioner of Patents